US007958617B2

(12) United States Patent
Pasolini

(10) Patent No.: US 7,958,617 B2
(45) Date of Patent: Jun. 14, 2011

(54) SCREW, PARTICULARLY FOR THE ELECTRICAL CONNECTION OF A CABLE TERMINAL TO A RAILWAY TRACK OR THE LIKE

(75) Inventor: Vittorio Pasolini, Brescia (IT)

(73) Assignee: Cembre S.p.A., Brescia (IT)

( * ) Notice: Subject to any disclaimer, the term of this patent is extended or adjusted under 35 U.S.C. 154(b) by 1072 days.

(21) Appl. No.: 10/588,892

(22) PCT Filed: Mar. 5, 2004

(86) PCT No.: PCT/IT2004/000112
§ 371 (c)(1), (2), (4) Date: May 7, 2007

(87) PCT Pub. No.: WO2005/086290
PCT Pub. Date: Sep. 15, 2005

(65) Prior Publication Data
US 2007/0264885 A1 Nov. 15, 2007

(51) Int. Cl.
*B23P 11/00* (2006.01)
*H01R 4/30* (2006.01)

(52) U.S. Cl. .......................................... 29/505; 439/801

(58) Field of Classification Search .................... 29/505, 29/525, 525.01, 525.02, 525.05; 439/801; 411/9, 960
See application file for complete search history.

(56) References Cited

U.S. PATENT DOCUMENTS

| | | | |
|---|---|---|---|
| 3,476,010 | A | 11/1969 | Markey |
| 3,816,820 | A | 6/1974 | Stanaitis |
| 6,244,517 | B1 | 6/2001 | Courtois et al. |

FOREIGN PATENT DOCUMENTS

| | | |
|---|---|---|
| DE | 84 24 430 | 8/1985 |
| EP | 1 300 598 | 4/2003 |

*Primary Examiner* — John C Hong
(74) *Attorney, Agent, or Firm* — Dickstein Shapiro LLP

(57) ABSTRACT

A screw for the electrical connection of a cable terminal to a railway track or the like comprises a base body having an elongated shank having a longitudinal axis, a strike head connected with a first end of the shank, and threads for the removable connection of a strike organ or nut with a second end of the shank opposite said first end. The screw further comprises a support element manufactured separately from the base body and associated to the strike head so as to form a stroke that defines a cavity turned towards the second end of the shank. The screw is pre-assembled and the support element is substantially irreversibly connected to the base body.

33 Claims, 7 Drawing Sheets

SCREW, PARTICULARLY FOR THE ELECTRICAL CONNECTION OF A CABLE TERMINAL TO A RAILWAY TRACK OR THE LIKE

The present invention relates to a screw for the electrical connection of a cable terminal to a railway track or the like.

The invention further relates to a method of manufacturing the screw and equipment for performing said method.

The invention further relates to a nut for the electrical connection of a cable terminal to a railway track or the like.

Italian patent IT 1215911 describes a permanent electrical contact that can be applied on the shank of tracks and the like. This contact provides a bush in an electrically conducting material having a cylindrical stem that can be inserted into a through hole formed in the track and a flange head engageable to abut with the portion of track surrounding the hole. The bush defines an axial through hole, inside which is introduced, from the side of the flange head, a calibrated punch provided with a threaded end and a widening truncated cone portion. The threaded end protruding from the bush and the hole engages a corresponding threaded seat of a hydraulic jack, which, abutting against the track, pulls the punch through the axial hole of the bush so that the widening portion of the punch moves the material of the bush radially towards the outside thus tightening it in close contact with the track hole wall. The excess material of the bush is drawn axially and forms on the outlet side of the punch of the track a further rim opposite the abovementioned flanged head.

In the thus obtained calibrated hole, a stay-bolt is introduced that can be coupled with a tightening nut for bolting a cable terminal of an electric cable against the flanged head of the bush.

In order to restrict the mechanical stress of the electrical contact it is known to provide a washer provided with a release portion on the face turned towards the end or rather the rim of the bush in order to transfer the pressure produced by the screw directly onto the track, without negatively influencing the electrical connection. In any case, the washer, being a separate additional piece, entails the risks of being lost, confusion with other types of washer and doubt on how to direct and associate it to the screw or the contact. The assembly errors that result compromise the quality and reliability of the electrical contact.

Besides, due to the presence of the released washer, the head of the screw or the nut that rests on the washer does not frictionally engage the track. As a consequence this head or nut tends to turn during screwing, thus making indispensable the use of two spanners to tighten the contact.

The object of the present invention is therefore to provide a screw for the electrical connection of a cable terminal to railway track or the like, having characteristics such as to overcome the drawbacks mentioned with reference to the prior art.

This object is achieved by a screw according to claim 1. A further object of the present invention is to provide a method for manufacturing the abovementioned screw. This object is achieved by a method according to claim 22.

A further object of the present invention is to provide suitable equipment for performing the above-mentioned method. This object is achieved by equipment according to the claim 27.

A further object of the present invention is to make available a tightening nut for the electrical connection of a cable terminal to a railway track or the like, having characteristics such as to overcome the drawbacks mentioned in reference to the prior art.

This object is achieved by the nut according to claim 21.

In order to better understand the present invention and appreciate the advantages thereof, some embodiments thereof will be described below as non-limiting examples, referring to the attached drawings, wherein.

Figure 1:
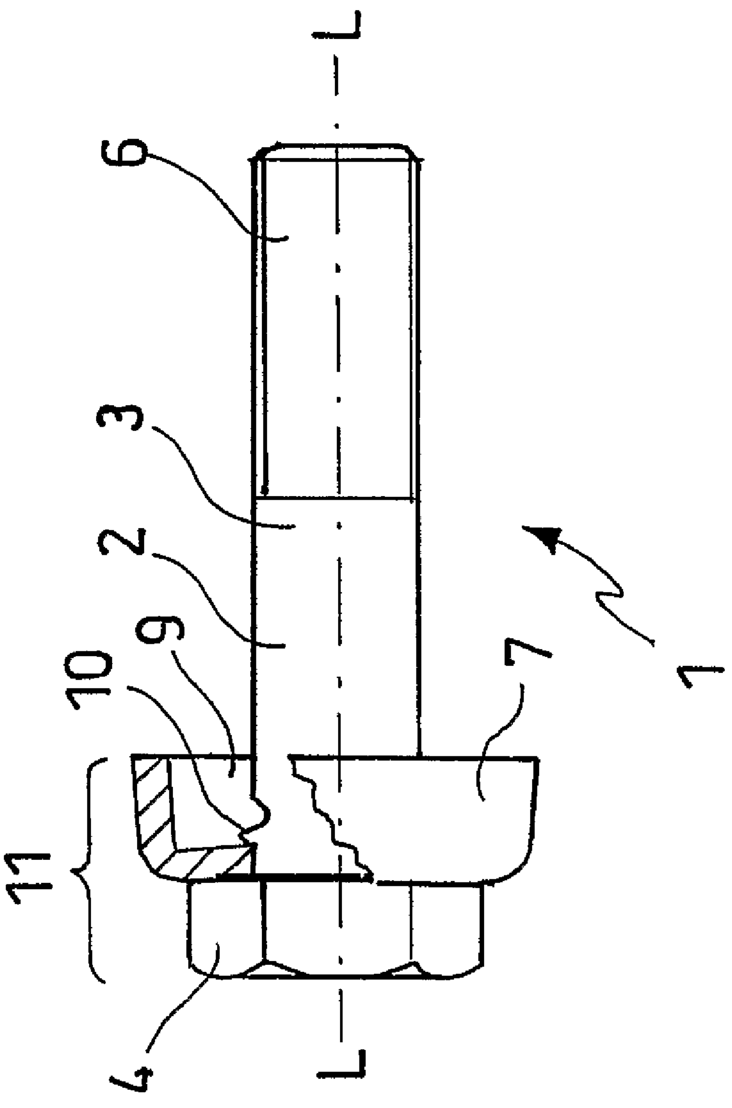
FIG. 1 is a partially sectioned side view of a screw according to the invention.
Figure 2:
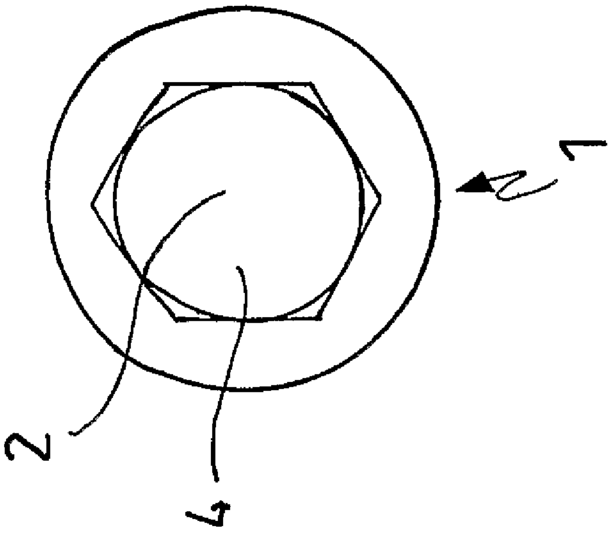
FIG. 2 is a top view of the screw in FIG. 1.
Figure 4:
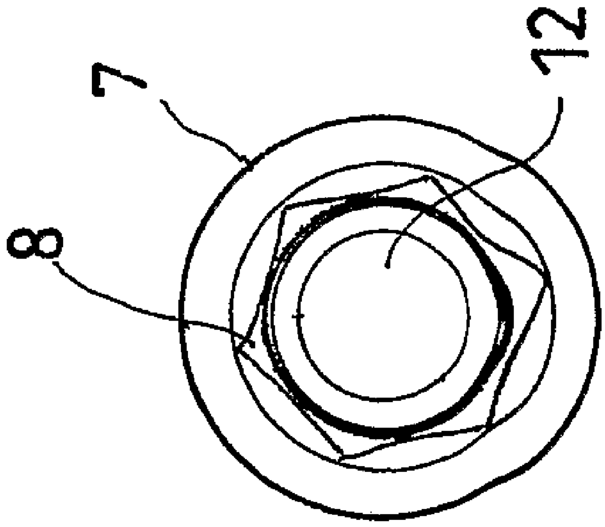
FIG. 4 shows a detail of the screw in FIG. 1.
Figure 3:
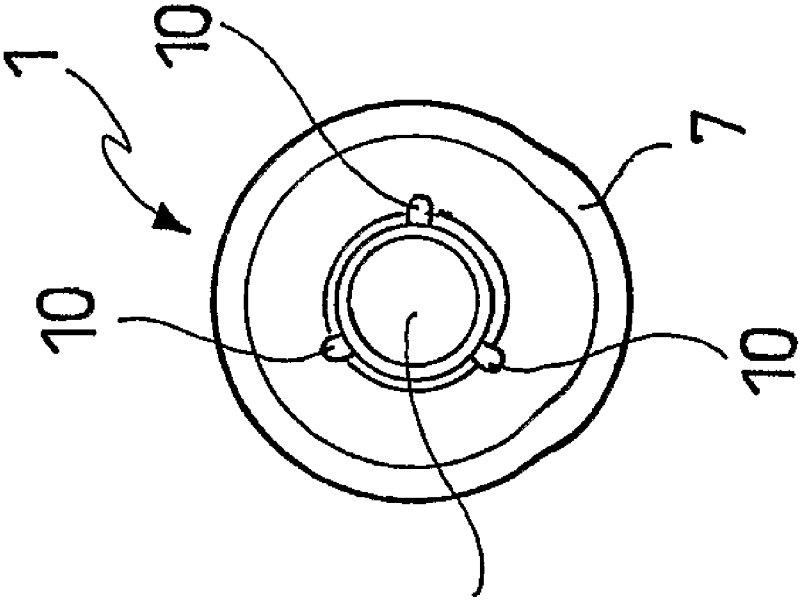
FIG. 3 is a bottom view of the screw in FIG. 1.
Figure 6:
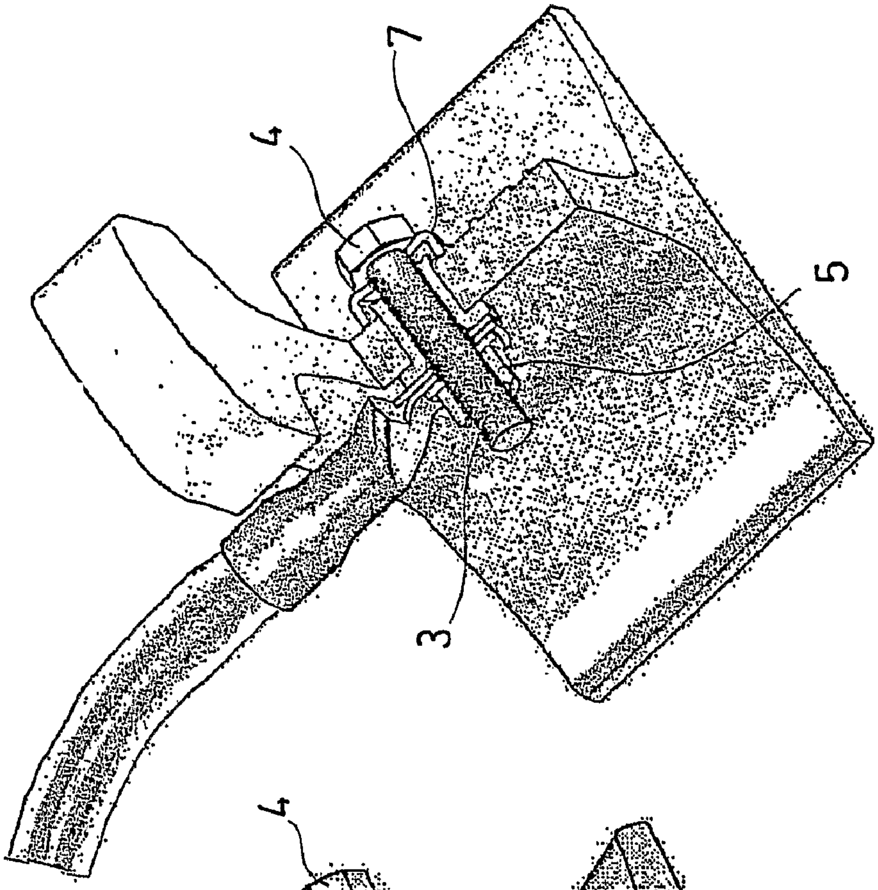
FIG. 6 is a partially sectioned perspective view of the screw of FIG. 1 mounted on a track.
Figure 5:
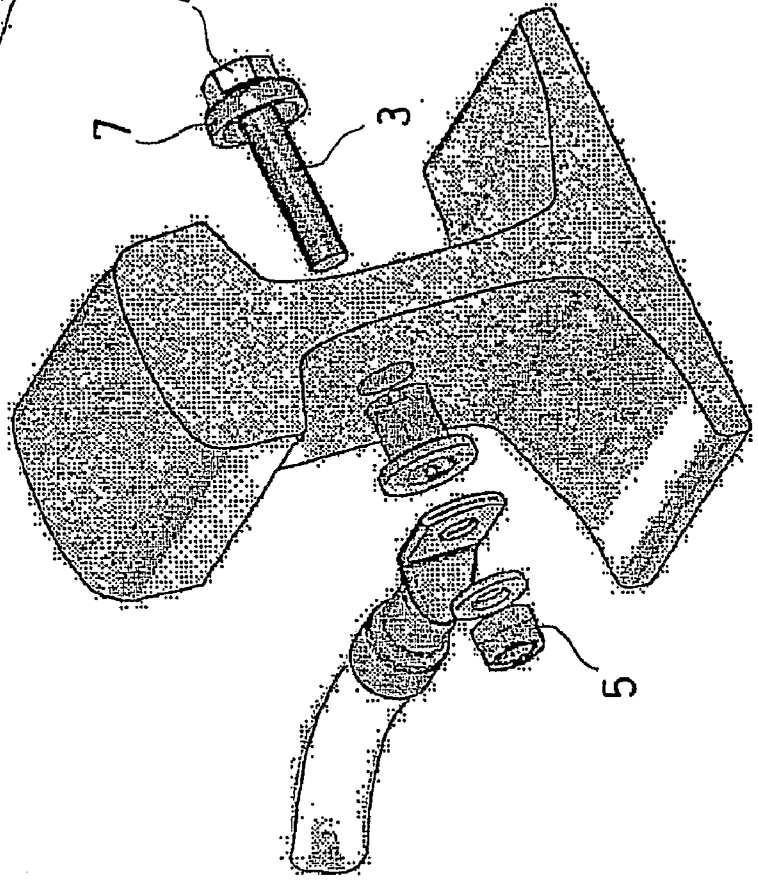
FIG. 5 is an exploded view of the screw of FIG. 1 in an assembly phase.
Figure 7:
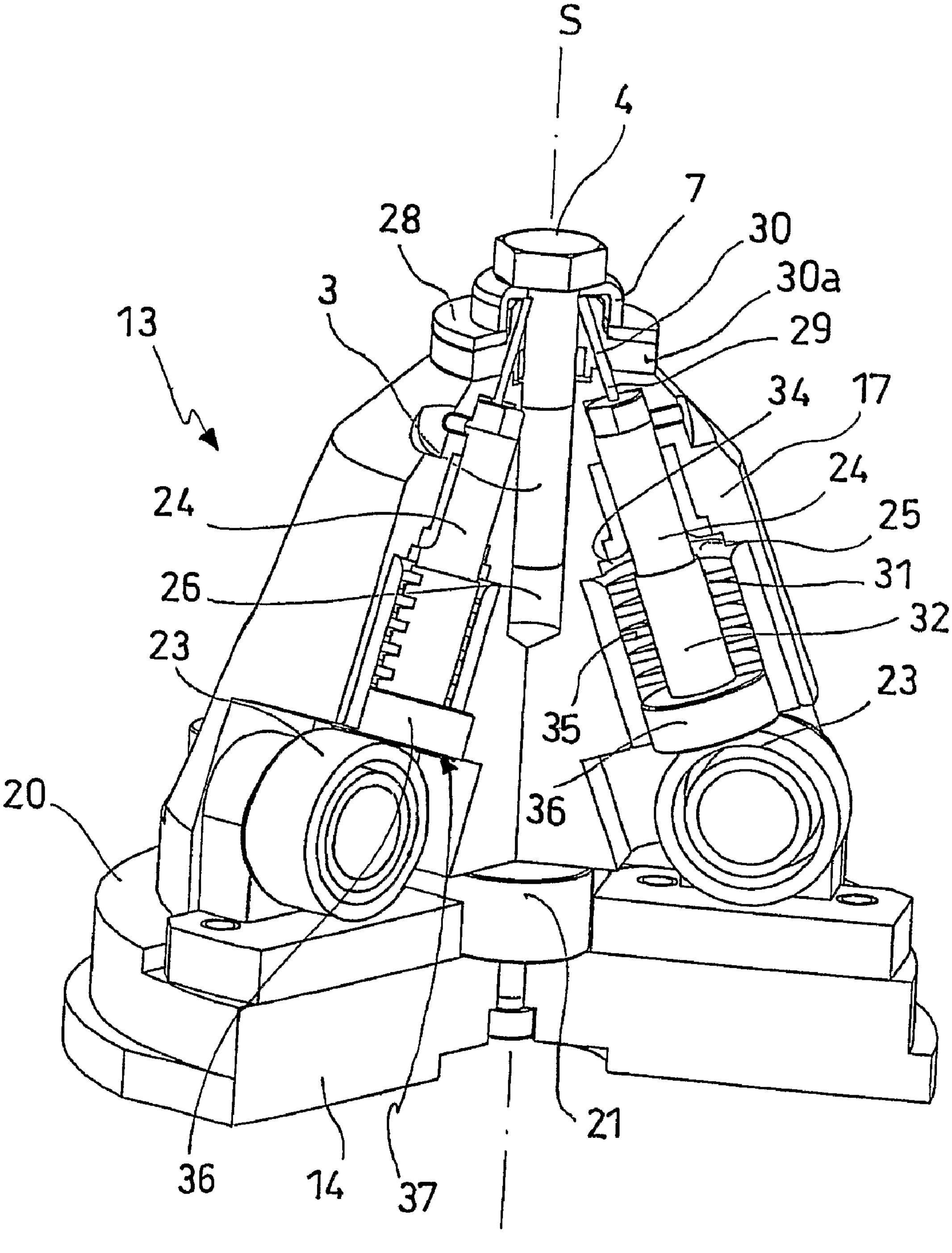
FIGS. 7 and 8 are partially sectioned perspective views, of equipment for manufacturing the screw in FIG. 1.
Figure 8:
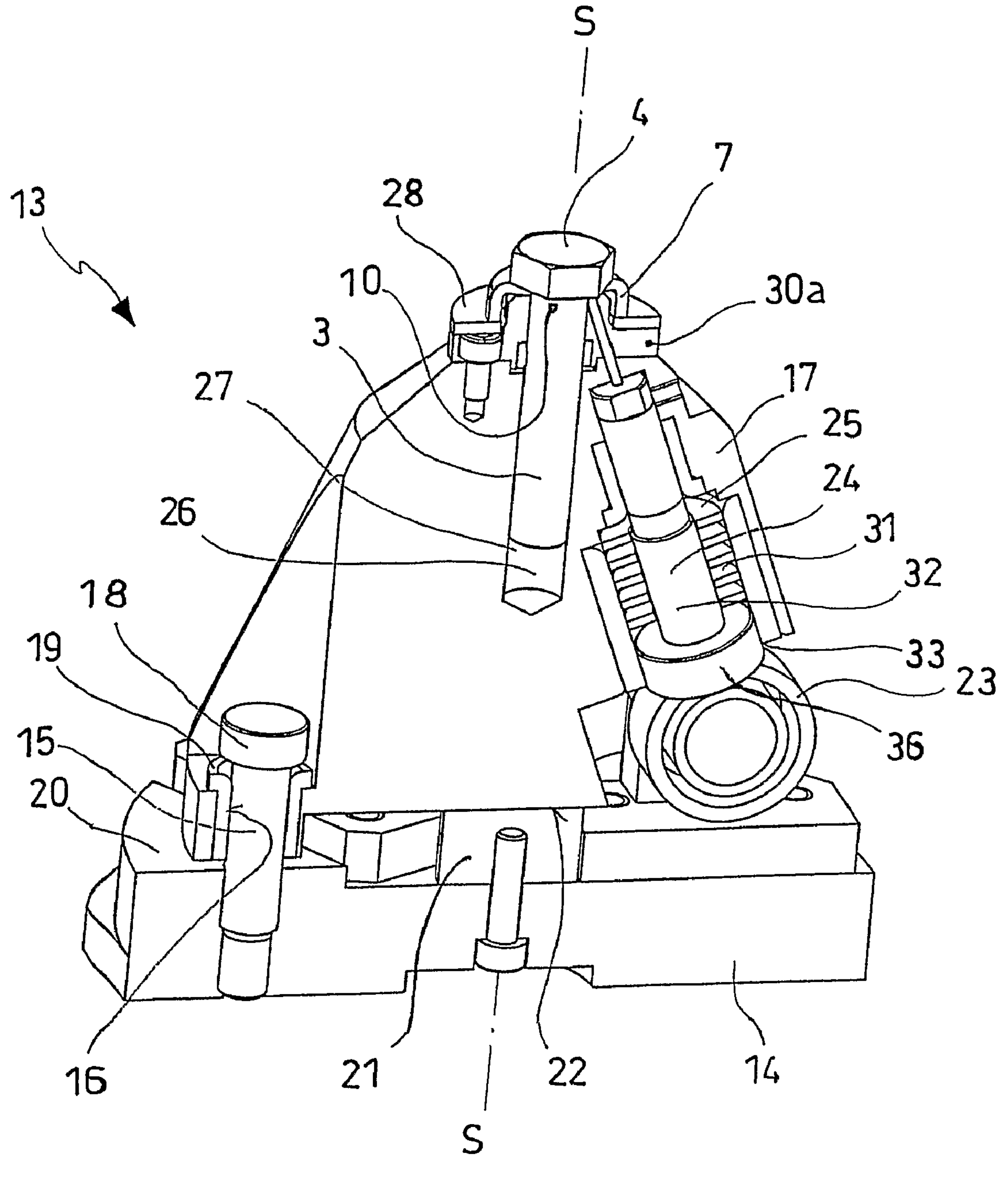

With reference to the figures, a screw for the electrical connection of a cable terminal to a railway track or the like is globally indicated with reference 1.

The screw 1 comprises a base body 2 with an elongated shank 3 having a longitudinal axis L, a strike head 4 connected, preferably integrally, with a first end of the shank 3, and means for the removable connection of a strike organ, such as a nut 5, with a second end (free) of the shank 3, opposite the first end.

Such removable connection means comprise for example an outer threading 6 on the circumferential surface of the shank 3, at the free end thereof, suitable to engage a corresponding inner threading of the nut 5.

Alternatively, the removable connection means can be made as bayonet coupling means or the like, provided that they are suitable to tighten the strike organ, i.e. the nut 5, in the direction of the strike head 4 of the screw 1.

The screw 1 further comprises a support element 7 manufactured separately from the base body 2 and associated to the strike head 4 so as to form a stroke 11 that defines a cavity 9, preferably ring-shaped, arranged around the shank 3 and turned towards the free end thereof.

In accordance with one embodiment, the support element 7 has the shape of a flattened cap provided with a central aperture 12 that houses the shank 3 of the screw 1. The central aperture 12 is preferably a hole with a diameter greater than the diameter of the shank 3 in order to provide a gap between the shank 3 and the interdos of the hole 12, i.e. the surface that defines said aperture.

The screw 1 is pre-assembled and comprises means that make a substantially irreversible connection of the support element 7 to the base body 2. In particular, this irreversible connection does not depend on the connection or disconnection between the screw 1 and the nut 5.

In accordance with an embodiment of the invention, the support element 7 comprises a preferably polygonal impression 8, which engages at least part of the strike head 4 in order to make a form coupling of the support element 7 to the base body 2 rotatably integral around the longitudinal axis L.

Advantageously, the impression 8 has a shape substantially complementary to the shape of the strike head 4. This enables, during the assembly of the screw to the track, the use of a single spanner, as from the instant in which the support element frictionally engages the track, the strike head 4 is also rotatably locked.

In accordance with a further embodiment, the support element 7 and the base body 2 are translatably integral along the longitudinal axis L.

This translatably integral connection is preferably made by means of one or more projecting parts 10 that protrude from the shank 3, preferably radially in relation to the longitudinal axis L, and rest against the support element 7, thus keeping it substantially in contact with the strike head 4.

One advantageous embodiment provides that three projecting parts 10 are distributed at constant pitch to the shank 3. According to a further development of the invention, the projecting parts 10 are at least partially plastically deformable, for example by the tightening of the screw 1 on irregular surfaces. This enables, in the deformed state of the projecting parts 10, limited relative movements between the base body 2 and the support element 7, for example an inclination of the support element 7 in relation to the longitudinal axis L, suitable for compensating the irregularities of the surface. It is thus possible to make an electrical contact even in those zones of the track, in which there are producer identification codes, of the steel type etc. as an impression or in relief, without stressing the screw with secondary moments due to an incomplete and/or eccentric rest of the strike head 4.

In the non-deformed state, the projecting parts 10 preferably make a substantially rigid connection between the base body 2 and the support element 7.

Advantageously, both the base body 3 and the support element 7 are obtained in metallic material, preferably steel.

According to one particularly advantageous embodiment, the projecting parts 10 are obtained by deformation, preferably when cold, of the material of the shank 3, as shown for example by FIG. 1. Such deformation of the material of the shank 3 can be advantageously obtained through a process known as calking.

According to an alternative application of the inventive concept described thus far, the support element 7, instead of being associated to the screw 1, is associated to the nut 5.

In exactly the same way as described so far with reference to the screw 1, said nut 5 comprises a strike head and means, for example threaded, for the removable connection of the strike head with a screw. The nut 5 further comprises a support element identical to the support element 7, manufactured separately from the strike head of the nut 5 and associated thereto so as to form a stroke that defines a cavity destined to be turned towards the strike head of the screw, wherein the nut is pre-assembled and comprises means making a substantially irreversible connection of the support element to the strike head.

A method for manufacturing the screw 1 according to the present invention is described below.

Generally, the method comprises the phases of providing the base body 2 and the support element 7, produced separately from the base body 2, to associate the support element 7 to the strike head 4 so as to form the stroke 11 that defines the cavity turned towards the free end of the shank 3, of pre-assembling the screw 1, connecting the support element 7 in a substantially irreversible way to the base body 2.

In accordance with one embodiment, the shank 3 is inserted into the central aperture 12 of the support element 7 until the point where the latter rests against the strike head 4. Subsequently, at least part of the material of the shank 3 itself is deformed to form said one or more projecting parts 10 that make the irreversible connection.

Advantageously, the phase of deformation of the material of the shank 3 takes place cold, preferably through a forced shift of the material of the circumferential surface of the shank 3 along the longitudinal axis L in the direction of the strike head 4 and against the support element 7, without however completely detaching from the shank 3 the shifted material. The thus obtained burrs or shavings rest against the support element 7 that is trapped between said projecting parts 10 and the strike head 4.

Advantageously, the force of reaction or contrast of the force necessary for the deformation of the material of the shank 3 along the longitudinal axis L is used to press the strike head 4 against the support element 7, thus making in the latter the abovementioned impression 8 having the form, preferably polygonal, of the strike head 4 of the screw 1. Equipment 13 specifically designed to and suitable to perform the method above is described below.

The equipment 13 comprises a base plate 14 and a support device 17.

The support device 17 is connected with the base plate 14 by one or more guide pins 15 housed in special guide holes 16 of the support device 17 and screwed into the base plate 14. The guide pins 15 enable a sliding of the support device 17 in relation to the base plate 14 along a sliding axis S between an initial position, in which the support device 17 is moved away from the base plate 14, and a final position, wherein the support device 17 is moved towards the base plate 14.

The guide pins 15 have a widened head 18 suitable to abut against a corresponding stroke surface 19 of the support device 17 in order to prevent the protrusion of the guide pins 15 from the guide holes 16 and in order to provide a run-out in the abovementioned initial position.

In accordance with the embodiment shown in the figures, the base plate 14 has the shape of a circular disk and three guide pins 15 equally spaced from one another are arranged in the vicinity of a peripheral edge 20 of the base plate 14.

A support element 21 arranged in the central part of the base plate 14 and preferably adjustable in height defines the final position of the relative movement between the support device 17 and the base plate 14 and forms, together with a corresponding stroke surface 22 of the support device 17, an run-out in this final position.

The base plate 14 further comprises one or more rest organs 23 for as many incision tools 24, housed in special cavities 25 of the support device 17.

The support device 17 has a substantially truncated cone form with the major base turned towards the base plate 14.

In correspondence with the minor base, or on the side of the support device 17 opposite the base plate 14, a seat 26 is made having a substantial cylindrical portion 27 suitable to house the shank 3 of the screw 1 and a rest surface 28 for the support element 7 inserted on to the shank 3 of the screw 1. In order to assure the rest of the support element 7 on the rest surface 28 and the contact of the strike head 4 with the support element 7 it is important that the seat 26 has a greater length than the length of the shank 3.

Around the seat 26 for the screw three cavities 25 are arranged for housing as many incision tools 24. Such cavities 25 extend along axes inclined in relation to the longitudinal axis of the seat 26 for the screw and comprise a first section 29 that outlets into the latter in the vicinity of the rest surface 28 and forms a guide for an incision tip 30 of the corresponding incision tool 24. The reference 30*a* indicates a guide element of the incision tips. According to an advantageous embodiment, this guide element 30*a* is interchangeable so that, by means of its replacement and a different adjustment of the incision tool 24, it is possible to fit out screws of different diameter. A second section 31 of the cavities 25, wider than the first section 29, houses an activation portion 32 of the incision tool 24.

This second section 31 has an aperture 33 turned towards the base plate 14 in correspondence with the rest organs 23 and a shoulder 34 suitable to form a contrast seat for a spiral spring 35.

The incision tools 24 comprise an activation portion 32 and a replaceable incision tip 30, that can be adjusted in relation to one another in order to be able to conveniently vary the total length of the incision tool. The end of the activation portion 32 opposite to the incision tip 30 is widened thus forming a flange 36 that makes, on the side thereof turned towards the incision tip 30, a contrast seat for the spring 36 and, on the opposite side, an activation surface 37 on which the corresponding activation organ 23 of the base plate 14 acts.

The incision tools 24 are slidingly housed inside the cavities 25 between a rest position in which the incision tip 30 is retracted from the seat 26 for the screw and a work position in which the incision tip 30 is protracted in the seat 26 for the screw.

Thanks to the spring 35 acting between the flange 36 of the incision tool 24 and the shoulder 34 of the cavity 25, the incision tool 24 is permanently maintained in rest against the corresponding activation organ 23 of the base plate 14 and is elastically held in the rest position.

Thus, in the initial (distant) position of the support device the incision tool stops in the rest position thereof, whereas in the final (near) position of the support device the incision tool is shifted from the corresponding activation organ of the base plate, against the force of the spring, in the work position.

In accordance with the preferred embodiment, three equidistant incision tools are provided, arranged in the corresponding cavities around the seat 26 for the screw.

Figure 10:
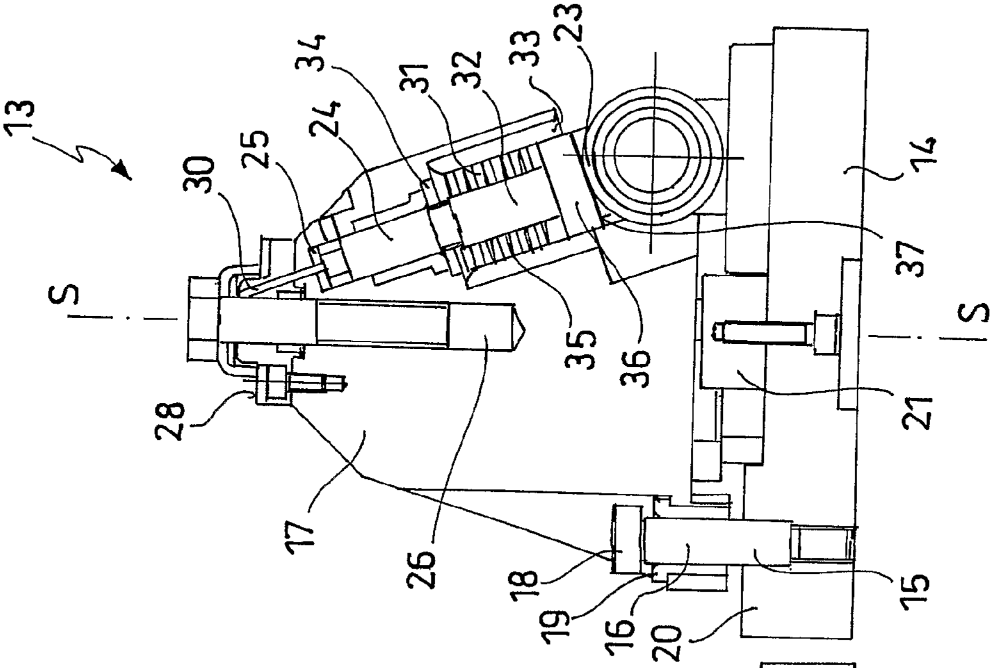
FIGS. 9, 10 and 11 are sectioned views of the equipment of FIG. 7 in three operation phases.
Figure 9:
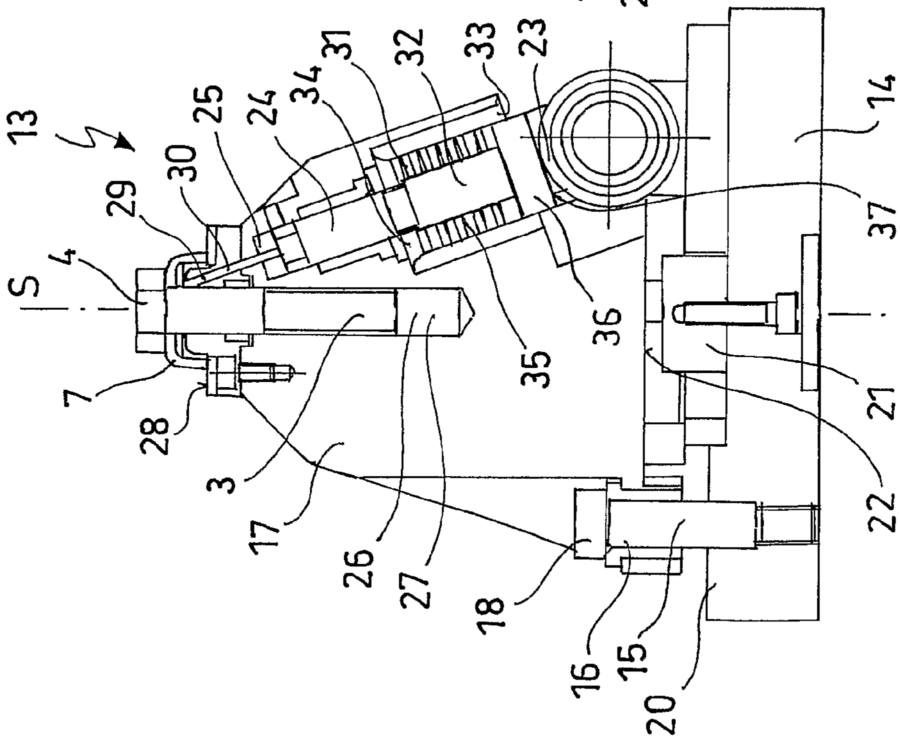
Figure 11:
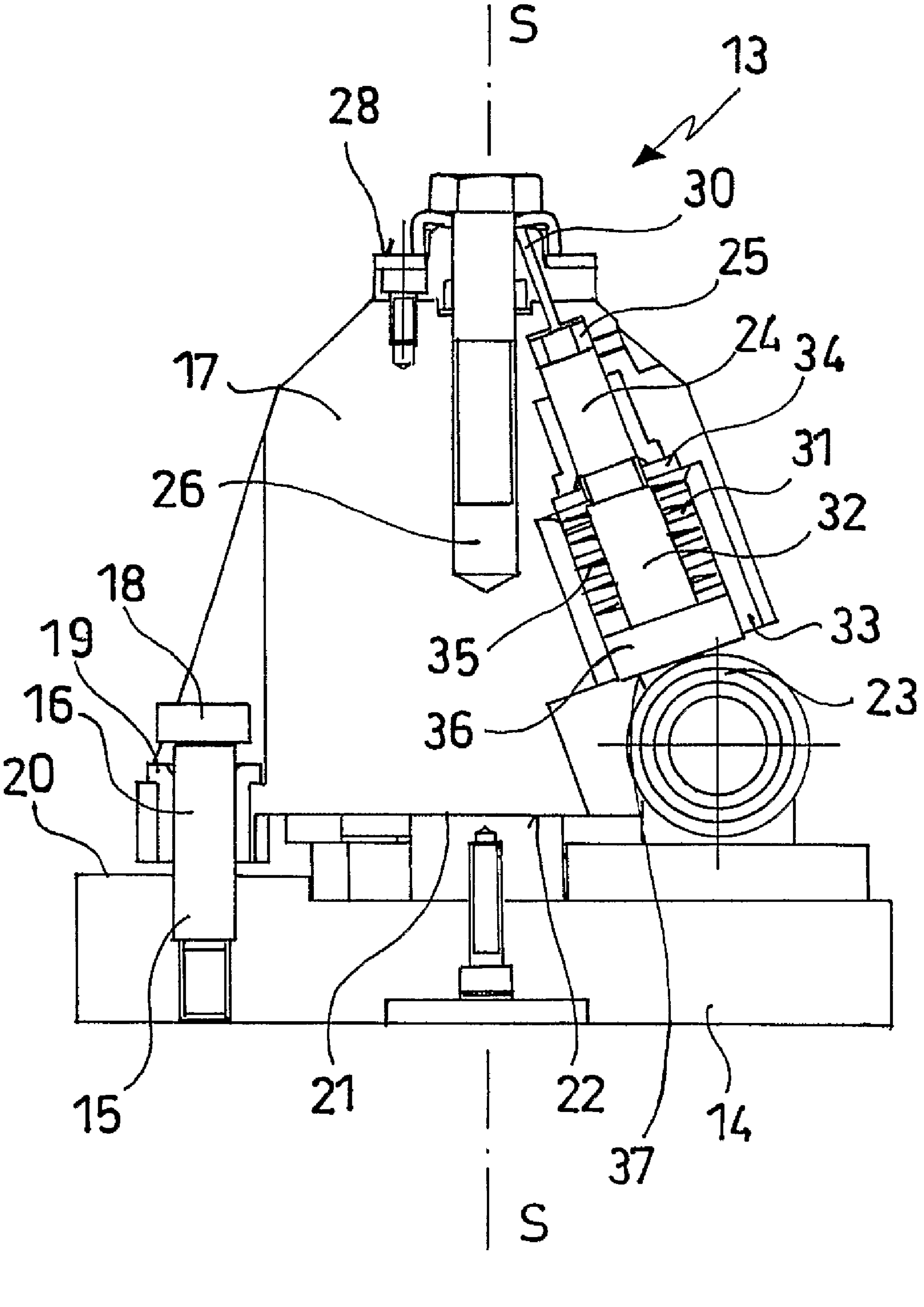

FIGS. 9, 10 and 11 show the operation of the equipment according to the present invention.

It can be inserted in a press (not shown) that acts on one hand on the base plate 14 and, on the other, on the strike head 4 of the screw inserted into the seat 26 of the support device 14.

At the start of a work cycle, the support device 14 stops, thanks to the elastic preload of the spring 35, in the initial position or, in other words, in the position distant from the base plate 14.

As the force exerted by the press increases, the spring 35 is compressed and the base plate 14 moves closer to the support device 17. The activation organs 23 of the base plate 14 move the incision tools 24 from the rest position into the work position, in which the incision tips 30 enter into the seat 26 for the screw and irreversibly deform the shank 3, by shifting the material of the surface thereof in a longitudinal direction in order to form the projecting parts 10 and push them against the support element 7.

Simultaneously, the strike head 4 of the screw 1 is pushed against the support element 7 so as to obtain the impression 8 of the strike head in the support element 7. The run-out of this operation is defined by the elimination of the distance present between the support element 7 and the guide element 30*a* of the incision tips.

At the end of the cycle, the support element 7 is irreversibly trapped between the projecting parts 10 and the strike head 4, which further engages the impression 8 of the support element 7.

The screw 1 according to the present invention has numerous advantages.

It efficiently overcomes the problem of confusion between different types of support elements or washers.

The screw 1 further enables an electrical connection between the cable terminal and the track that is safe and reliable even in the case of irregularities on the surface of the track.

Besides, thanks to the coupling in rotation between the base body of the screw and the support element it is sufficient to use a single spanner for tightening the screw.

What is claimed is:

1. Screw (1) for electrical connection of a cable terminal to a railway track, comprising a base body (2) having:

an elongated shank (3) having a longitudinal axis (L), a strike head (4) connected with a first end of the shank (3), means (6) for removable connection of a strike organ or nut (5) with a second end of the shank (3) opposite said first end, said screw (1) further comprising:

a support element (7) manufactured separately from the base body (2) and associated to the strike head (4) so as to form a stroke (11) that defines a cavity (9) turned towards the second end of the shank (3), wherein the screw (1) is pre-assembled and comprises means (10, 8) for making a substantially irreversible connection of the support element (7) to the base body (2), in which the support element (7) and the base body (2) are coupled such that they rotate together around the longitudinal axis (L).

2. The screw (1) according to the claim 1, wherein the strike head (4) and the shank (3) are formed integrally.

3. The screw (1) according to the claim 1, wherein said removable connection means (6) comprise an outer threading (6) of the shank (3) suitable to engage a corresponding inner threading of the strike organ or nut (5).

4. The screw (1) according to claim 1, wherein the support element (7) and the base body (2) are substantially integral in translation along the longitudinal axis (L).

5. The screw (1) according to claim 1, wherein the support element (7) and the base body (2) are coupled by a shape coupling between the support element (7) and the base body (2).

6. The screw (1) according to claim 1, wherein the irreversible connection means (10) enable limited relative movements between the support element (7) and the base body (2).

7. The screw (1) according to the claim 6, wherein the irreversible connection means (10) enable an inclination of the support element (7) in relation to the longitudinal axis (L).

8. The screw (1) according to claim 1, wherein the irreversible connection means (10) are at least partially deformable and configured so as to connect the base body (2) and the support element (7) rigidly when the irreversible connection means (10) are not deformed and enable limited relative movements between the base body (2) and the support element (7) when the irreversible connection means (10) are deformed.

9. The screw (1) according to claim 1, wherein the irreversible connection means (10) deform plastically during a tightening of the screw (1) on irregular surfaces.

10. The screw (1) according to claim 1, wherein said cavity (9) is ring shaped and extends and around the shank (3).

11. The screw (1) according to claim 1, wherein the support element (7) has the shape of a flattened cap provided with a central aperture (12) that houses the shank (3) of the screw (1).

12. The screw (1) according to claim 11, wherein the central aperture (12) is a hole having a greater diameter than the diameter of the shank (3), thus providing a gap between the shank (3) and the intrados of the support element (7).

13. The screw (1) according to claim 1, wherein said irreversible connection means (10) comprise one or more projecting parts (10) that protrude from the shank (3) and rest against the support element (7) thus keeping it in contact with the strike head (4).

14. The screw (1) according to claim 13, wherein said projecting parts (10) protrude radially in relation to the longitudinal axis (L).

15. The screw (1) according to claim 13, wherein said projecting parts (10) are distributed at constant pitch around the shank (3).

16. The screw (1) according to the claim 15, comprising three projecting parts (10).

17. The screw (1) according to claim 13, wherein said projecting parts (10) are obtained by deformation of the material of the shank (3).

18. The screw (1) according to claim 1, wherein the support element (7) comprises a polygonal impression (8) that engages the strike head (4) in order to make a joined shape coupling rotatably integral around the longitudinal axis (L).

19. The screw (1) according to claim 1, wherein said base body (2) and said support element (7) are in a metallic material.

20. Nut for electrical connection of a cable terminal to a railway track, comprising a strike organ and means for removable connection of the strike organ with a screw, and a support element (7) manufactured separately from the strike organ and associable thereto so as to form a stroke that defines a cavity destined to be turned towards a strike head of said screw, wherein the nut is pre-assembled and comprises means for making a substantially irreversible connection of the support element to the strike organ, and wherein the support element (7) and the base body (2) are coupled such that they rotate together around the longitudinal axis (L).

21. Method for manufacturing a screw (1) according to claim 1, comprising the following steps:

providing a base body (2) having:

an elongated shank (3) having a longitudinal axis (L), a strike head (4) connected with a first end of the shank (3), means (6) for the removable connection of a strike organ or nut (5) with a second end of the shank (3) opposite said first end, to provide a support element (7) manufactured separately from the base body (2) and provided with a cavity (9) and an aperture (12) suitable to house the shank (3);

inserting the shank (3) of the base body (2) into the aperture (12) of the support element (7) to a point in which the support element (7) abuts against the strike head (4) so as to form a stroke (11) that defines a cavity (9) turned towards the second end of the shank (3), comprising further the step of:

providing means (10, 8) for making a substantially irreversible connection of the support element (7) to the base body (2), and coupling the support element (7) to the base body (2) such that the support element (7) and the base body (2) rotate together around the longitudinal axis (L), and wherein the coupling is achieved by pressing the strike head (4) against the support element (7) so as to form in the support element (7) an impression (8) having a polygonal shape of the strike head (4).

22. The method for manufacturing a screw (1) according to the claim 21, wherein the deformation step of the material of the shank (3) takes place when cold.

23. The method for manufacturing a screw (1) according to claim 21, comprising the step of shifting material of the surface of the shank (3) along a longitudinal axis (L) thereof in the direction of the strike head (4) without completely detaching said material from the shank (3) in order to obtain burrs or shavings that rest against the support element (7) leaned in turn against the strike head (4).

24. The method according to claim 21, comprising the phase of deforming the material of the shank (3) in order to form one or more projecting parts (10) that make said substantially irreversible connection of the support element (7) to the base body (2).

25. The method according to claim 21, wherein the step of pressing the strike head (4) against the support element (7) includes elimination of distance present between the support element (7) and a guide element (30*a*) of incision tips.

26. Equipment (13) for irreversibly connecting a support element (7) to a base body (2) in order to manufacture a screw (1) according to claim 1, wherein said base body (2) comprises:

an elongated shank (3) having a longitudinal axis (L), a strike head (4) connected with a first end of the shank (3), means (6) for the removable connection of a strike organ or nut (5) with a second end of the shank (3) opposite said first end, and said support element (7) is manufactured separately from the base body (2) and associated to the strike head (4) so as to form a stroke (11) that defines a cavity (9) turned towards the second end of the shank (3), said equipment comprising:

a base plate (14) provided with one or more activation organs (23);

a support device (17) that defines a seat (26) suitable to house at least a part of the base body (2) of the screw (1);

one or more incision tools (24) provided with an incision tip (30), sliding connection means (15, 16) that connect the support device (17) to the base plate (14) slidingly along a sliding axis (S), wherein the activation organs (23) interact with the incision tools (24) so that movement of the support device (17) in relation to the base plate (14) entails a movement of the incision tools (24) in relation to the seat (26) so that the incision tips (30) deform material of the shank (3) in order to form one or more projecting parts (10) that make said substantially irreversible connection of the support element (7) to the base body (2), and a press suitable to act on the strike head (4) to press the strike head (4) against the support element (7) so as to form in the support element (7) an impression (8) having a shape, preferably polygonal, of the strike head (4) to couple the support element (7) and the base body (2) such that they rotate together about the longitudinal axis (L).

27. The equipment (13) according to the claim 26, wherein said one or more incision tools (24) are provided with a activation portion (32), said incision tip (30) and said activation portion (32) being adjustable in relation to one another in order to vary the total length of the incision tool (24).

28. The equipment (13) according to claim 26, wherein the sliding axis (S) is substantially parallel to a longitudinal axis of the seat (26) and said incision tips (30) extend along inclined axes in relation to the sliding axis (S).

29. The equipment (13) according to claim 26, wherein said sliding connection means comprise guide pins (15) slidingly housed in holes (16).

30. The equipment (13) according to claim 26, wherein said incision tools (24) are at least partially housed in special cavities (25) formed in the support device (17) that make movement guides thereof.

31. The equipment (13) according to claim 26, comprising elastic means (35) acting between said support device (17) and said incision tools (24) so as to stress the incision tools (24) elastically in a rest position, in which the incision tips (30) are retracted from the seat (26).

32. The equipment according to the claim 31, wherein said elastic means (35) are housed inside the cavities (25) for the incision tools (24).

33. The equipment according to claim 26, wherein said support device (17) and said base plate (14) comprise stop surfaces suitable to rest against one another in order to limit the sliding movement of the support device (17) in relation to the support plate (14).

* * * * *